March 18, 1941. J. JANDASEK 2,235,370

ELECTRICALLY CONTROLLED FLUID TRANSMISSION

Filed March 25, 1937 5 Sheets-Sheet 1

INVENTOR
JOSEPH JANDASEK
BY *O. E. Wilson.*
ATTORNEY

March 18, 1941.　　　J. JANDASEK　　　2,235,370
ELECTRICALLY CONTROLLED FLUID TRANSMISSION
Filed March 25, 1937　　　5 Sheets-Sheet 2
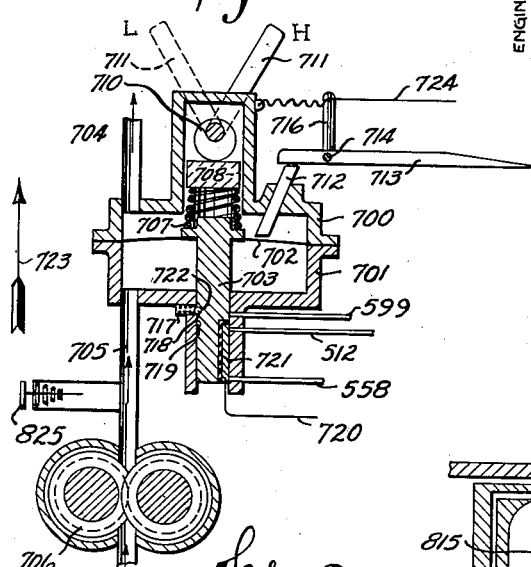
INVENTOR
JOSEPH JANDASEK
BY
ATTORNEY March 18, 1941.  J. JANDASEK  2,235,370
ELECTRICALLY CONTROLLED FLUID TRANSMISSION
Filed March 25, 1937  5 Sheets-Sheet 3

INVENTOR
JOSEPH JANDASEK
BY
A. E. Wilson
ATTORNEY

March 18, 1941. J. JANDASEK 2,235,370
ELECTRICALLY CONTROLLED FLUID TRANSMISSION
Filed March 25, 1937 5 Sheets-Sheet 4
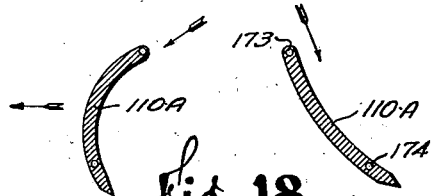
Fig. 18
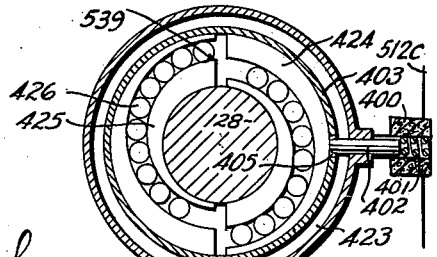
Fig. 20
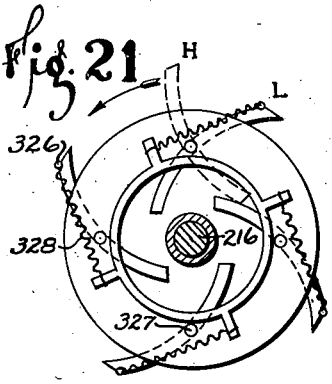
Fig. 21
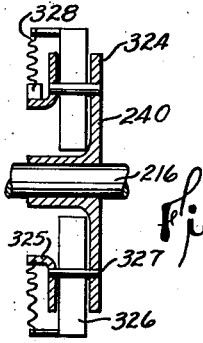
Fig. 22
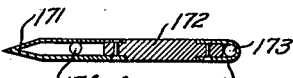
Fig. 19
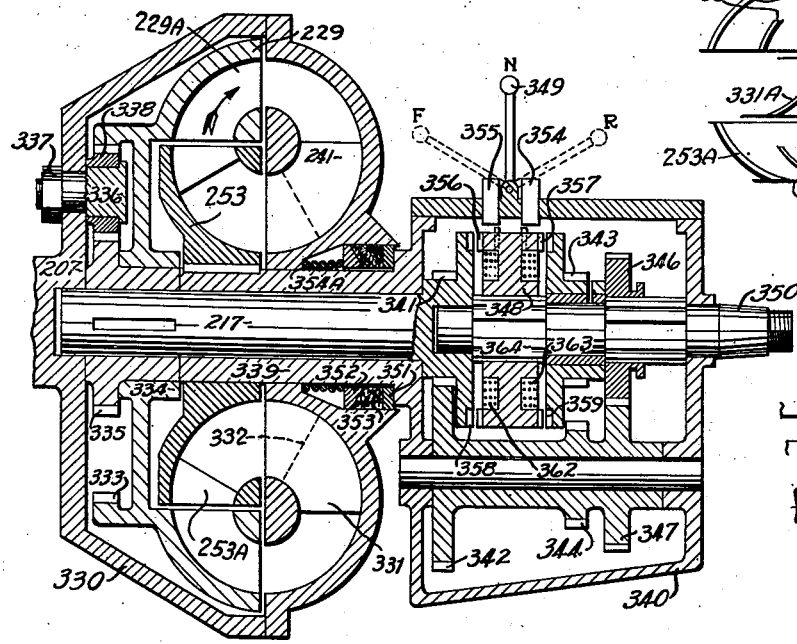
Fig. 25
Fig. 26
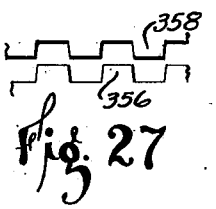
Fig. 27
INVENTOR.
JOSEPH JANDASEK
BY R. E. Wilson
ATTORNEY

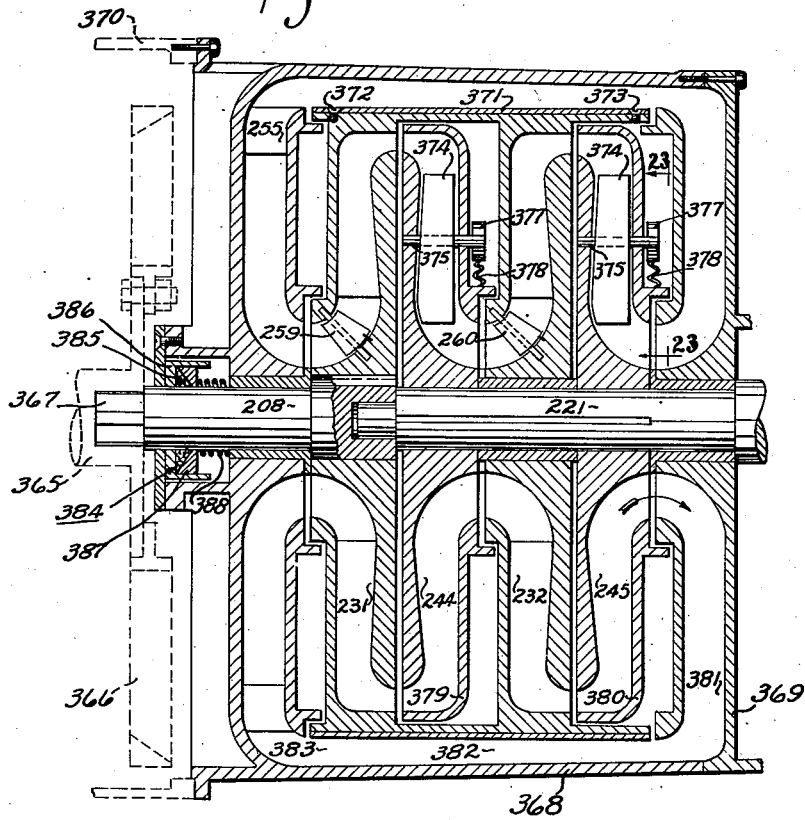

Patented Mar. 18, 1941

2,235,370

UNITED STATES PATENT OFFICE 2,235,370

ELECTRICALLY CONTROLLED FLUID TRANSMISSION

Joseph Jandasek, Cicero, Ill.

Application March 25, 1937, Serial No. 132,925

27 Claims. (Cl. 74—189.5)

This invention relates to means for transmitting power, and more particularly to a fluid transmission of the type having rotary driving or impeller means to impart energy to a fluid and driven or turbine runner means to absorb energy from the energized fluid. The invention is further characterized by the fact that vanes, stationary gates, or a guide wheel is interposed between the exit from the driven means and the entrance to the driving means.

I provide a high speed rotary mechanism for the transmission of power by means of a fluid driven at varying speeds in such a manner that from any applied driving speed and torque, the driven speed and torque obtained is such that the torque varies automatically in accordance with the load, and the speed varies inversely as the torque. In this manner the efficiency remains high throughout the whole range of speed because entrance angles of the driving, driven and stationary vanes is corrected to give the best results at all speeds and loads.

In hitherto known construuctions devised to obtain a difference in speed between the driving and driven members, fixed blades having substantially equal exit and entrance diameters have been used on the driving means or the impeller and on the driven means or the runner wheels, as well as guide vanes. In these constructions it is possible to obtain efficient transmission of power only when the difference in speed between the impeller and the runner is some predetermined amount. However, an apparatus which is efficient when running at the difference in speed between the impeller and the runner for which the fixed blades of the impeller and the runner are designed, becomes less and less efficient the more this predetermined difference in speed is departed from.

I have overcome this difficulty by providing an auxiliary turbine for the impeller and by providing flexible vanes for the runner in the invention described in my copending application Serial Number 304,634, filed September 8, 1928, now Patent Number 1,855,967. I have further provided auxiliary semi-free vanes for the impeller and for the guide wheel, and I have used adjustable main vanes for the guide wheel in the invention described in my copending application Serial No. 475,278, filed August 14, 1930, and I have provided adjustable blades for the runner in the invention described in my copending application Serial No. 506,636, filed January 5, 1931, now Patent Number 1,993,741, dated March 12, 1935. For the same purpose, in the present invention I have used semi-free vanes for the runner, and for the axial impeller with an exceedingly small number of vanes, and I have provided the guide wheel with exit diameter greater than entrance diameter, and have equipped the gates with entrance vanes automatically adjustable under the influence of the fluid.

A further difficulty in known fluid torque converters is that the maximum of efficiency occurs where the runner speed is only a little over half of the impeller speed. The efficiency drops off when the runner speed approaches the impeller speed or the ratio of 1:1, or direct drive. For these reasons the slow speed fluid torque converter has been impractical for use on motor vehicles where maximal efficiency on high or direct drive is essential.

In order to overcome this difficulty I have provided in the present invention semi-free and stationary vanes for the runner, and have designed the runner with stationary vanes having a much smaller entrance diameter than the exit diameter of the impeller. I have further designed the runner with substantially axial discharge of the smallest possible diameter.

In all the embodiments of my inventions referred to above I have used stationary casings for the fluid, while in the present invention I employ a revolving casing for the fluid.

The present fluid power torque converter consists principally of an impeller creating velocity and pressure energy as well as angular momentum in a circulating fluid. A runner or driven member absorbs velocity and pressure energy as well as angular momentum from the circulating fluid, and the stationary channels return the fluid from the runner to the impeller, and changes the pressure energy of the fluid into velocity energy thereby increasing angular momentum of the circulating fluid at heavy loads.

The fluid circulates because more energy is imparted to it by the impeller than is absorbed by the runner, and because additional pressure energy is created from the velocity energy of the fluid by diverging vanes of the runner. This is particularly true at heavy loads. At low speeds the centrifugal force of the fluid passing through the runner is smaller than at high speeds. In this manner my power transmitter is self-governing.

The main object of my invention is to maintain the efficiency of the torque converter constantly high particularly at high speeds, while obtaining a heavy torque in the runner at low speeds.

To accomplish these results I employ auxiliary semi-free vanes for the runner, the impeller, and for the gates.

Another object of this invention is to provide a turbo transmission with a guide wheel of the largest possible exit diameter arranged in such a manner that the fluid leaves the main gates at substantially an axial direction. In this manner the required angle of inclination of the gates is increased and the fluid friction for the same amount of angular momentum imparted by the gates is decreased. In this manner the guide wheel functions as a "vortex chamber."

Another object of my invention is to provide a new combination o. a fluid torque converter having a reverse gear, and to provide quick and easily operated means including a momentary free wheeling clutch for controlling said reverse gear.

A further object of the invention to equip the secondary or driven shaft with a brake to stop it from rotating, so that the gears in the gear transmission may be engaged or disengaged without shock under all operating conditions.

Another object is to make the turbo transmission as a completely independent self-contained unit which may be fastened to the engine in any desired manner such, for example, as by a few bolts, and to support the driving and driven shaft of the transmitter by two bearings only.

A further object of the invention is to balance the axial thrust of the impeller and the runner.

A still further object is to control the reversing means by moving a lever or pedal without bringing the vehicle to a complete stop.

Yet a further object is to provide a storage chamber for fluid leakage, and means for pumping this fluid from the storage chamber back to the fluid transmitter while the fluid transmission is operating.

Another object is to provide automatically operated means for connecting the driving and the driven means to obtain a direct or a high speed drive, thereby eliminating practically all the transmission losses.

Still another object is to provide an automatic and positive one-way clutch between the driving and the driven member so that the engine may be used as a brake in either both forward or reverse speeds.

A further object of my invention is to provide a shiftable guide wheel which may be moved in and out of the fluid circuit to provide the correct blades for low speed, and intermediate speed, and which may be shifted out of the circuit for high speed.

Another object is to provide a shiftable guide wheel to form a single stage turbine for intermediate speed and a two-stage turbine for low speed.

A still further object is to increase the capacity of a turbo transmission by employing planetary gearing to return part of the energy to the driving shaft at heavy load, while at the same time increasing the efficiency by transmitting a part of the energy directly to the driven shaft.

Another object is to provide means including planetary gearing to return part of the energy transmitted to the engine.

A further object is to provide controlling means whereby a direct drive, overdrive or low speed drive become effective automatically at the proper time according to the speed of the driven shaft and the amount of horsepower required.

Yet a further object of the invention is to provide blade wheels having pivoted blades, adjustable by means of centrifugal force, fluid pressure, and spring tension to maintain a correct adjusted position.

Another object is to provide means to put the transmission quietly in reverse at any speed and at any moment so that the power of the engine can be employed to stop the vehicle.

Other objects and advantages of this invention will be apparent from the following detailed description considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 2 is a sectional view taken on the line 2—2 of Figure 1, showing an automatic clutch between the impeller and the runner;

Figure 3 is a vertical section through the control device for magnetic clutches for overdrive and direct drive;

Figure 4 is a diagrammatic view showing flexible main and semi-free guide vanes;

Figure 5 is a part sectional view through the control device for the magnetic clutches for an overdrive, direct and low speed;

Figure 6 is a diagrammatic view illustrating how the control device becomes effective at various speeds;

Figure 7 is a half vertical section through a turbo transmission embodying the present invention;

Figure 8 is a sectional view illustrating a transmission having two turbo clutches mounted in series;

Figure 9 is a diagrammatic view showing the second stage turbine blades illustrated in Figure 1;

Figure 10 is a diagrammatic view showing the entrance blades of the impeller illustrated in Figure 1;

Figure 18 is a section through a flexible vane of the guide wheel shown in Figure 1, left for heavy loads, right for light loads;

Figure 19 is an enlarged sectional view through the vane illustrated in Figure 8, showing its construction;

Figure 20 is a sectional view of a one-way clutch;

Figure 21 is a sectional view of a runner employing pivoted blades, held in position by springs;

Figure 22 is a vertical sectional view of Figure 21;

Figure 23 is a diagrammatic view of a counterbalancing weight and spring operably connected to a blade;

Figure 24 is a sectional view of a turbo-transmission employing vanes of the type shown in Figure 23;

Figure 25 is a diagrammatic development of the fixed runner vanes employed in the device illustrated in Figure 26;

Figure 26 is a vertical section of my high speed turbo transmission wherein the impeller is operated by planetary gearing;

Figure 27 is a diagrammatic view showing the shape of the jaw clutches used with the transmission illustrated in Figure 26.

Figure 1:
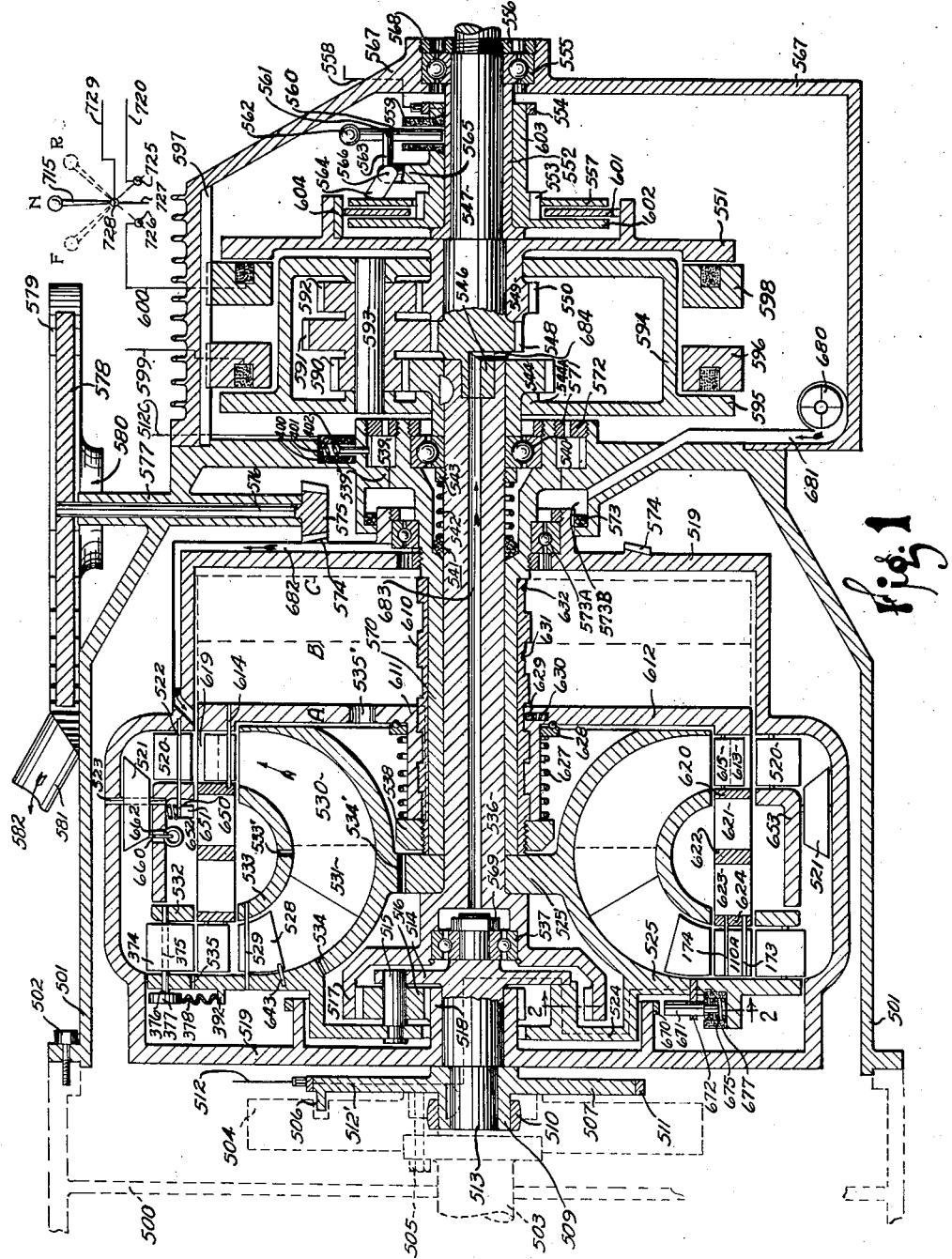
Figure 1 is a longitudinal section of a turbo torque converter combined with a reverse, direct and overdrive gear constructed in accordance with my invention.
Figure 11:
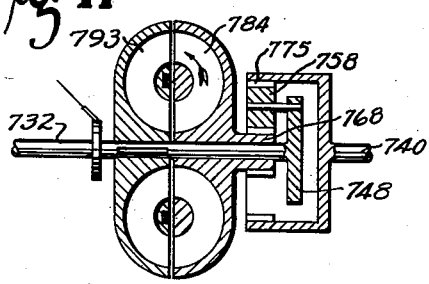
Figure 11 is a vertical sectional view illustrating a turbo clutch combined with planetary gearing.

In the embodiment of the invention illustrated in Figures 1 to 4, 9, 10 and 14, it will be observed that a two-stage turbine runner, a two-stage guide wheel and an impeller, combined with a planetary overdrive and reverse gear are employed.

An engine flywheel housing 500 receives a transmission housing 501, and is fixed thereto by bolts 502. The engine crankshaft 503 is provided with a flywheel 504, attached thereto by bolts 505. A plurality of studs 506 carried by a flange 507 engage the flywheel 504 to transmit turning moment from the flywheel 504 to the flange 507, but permit relative longitudinal movement of the flywheel and the flange, to facilitate manufacturing, assembling and installation of the device. To obtain still more freedom in alignment, to accommodate larger permissible angle of misalignment, the hub 509 of the flange 507 is piloted in a ball-shaped bushing 510, rotatably secured in the center of the flywheel. The flange 507 carries at its periphery, an insulated collector ring 511 in constant contact with an electrical conductor 512.

Torque from the flange 507 is transmitted by a shaft 513 to a spider 514 equipped with studs 515 carrying planet pinions 516. These pinions drive a ring gear 517 on the outside, and drive a sun gear 518 on the inside. The sun gear is formed integral with a rotary casing 519 having two sets of impeller vanes 520 and 521 mounted on pivots 522 and 523. The sun gear rotates on the shaft 513.

The studs 515 at their front end are secured in a flange 524 formed integral with a turbine runner web 525 which carries a first-stage turbine wheel 374, pivotally mounted at 375, and a second-stage turbine wheel 528, pivotally mounted at 529, and a set of fixed main blades 530, as well as short fixed blades 531. The blades 531 are provided with a shroud 533, while a shroud 532 is carried by the pivots 375. The shroud and the web are provided with balancing holes 533', 534, 534', 535 and 535'.

The ring gear 517 is connected to a driven shaft 536, and is rotatably mounted on the rear end of the shaft 513 by means of a double thrust ball bearing 537, and a nut 569.

The driven shaft 536 which rotates in the runner web hub 525' carries a sleeve 570, which at the front end is provided with a nut 538, but at the rear end is supported by a combination of a one-way clutch 539, a nut 571 and bearing 539'. At the same end the sleeve 570 carries a ball bearing 540, supporting the shaft 536, which is provided with a stuffing box 541, a spring 542 and a locking nut 543. The shaft has a central hole 683, and carries a driving gear 544.

Piloted with reference to the driven shaft 536 at 546, is a gear transmission shaft 547 having a driven pinion 548, a sleeve 549 having a sun gear 550 and a flange 551 rotatably mounted on the driven shaft 547. A sleeve 552, and a bearing 555 are secured to the transmission shaft by means of a nut 556. This sleeve is provided with another sleeve 603 having a spline 553 for a clutch disc 557 at the front end, while at the rear end it has an insulated collector ring 554 in contact with an electrical conductor 558, which furnishes electric current to an electrical coil 559 having a solenoid 560 shiftably mounted therein. The solenoid is provided with a weight 562 to counterbalance the action of the electromagnet. The solenoid 560 is pivotally mounted at 561 to a lever 563, having a cam 564 at its front end. The cam determines the axial location of the disc 557, and the lever 563 is mounted to a boss 565 at the pivot 566.

The bearing 555 is mounted in a gear transmission housing 567 by means of a nut 568. The housing 567 is also bolted to the case 501. The one-way clutch 539 is also mounted in the casing 501 by means of a nut 572. A packing 573 and a bearing 573A in an annular space 573B for the rotary casing 519 is carried in the casing 501.

A bevel gear 574 carried by the casing 519 drives a bevel pinion 575 mounted upon a supercharger shaft 576, which revolves in a sleeve 577 fixed in the casing 501, and carries a supercharger impeller 578. The air enters into the supercharger 579 as shown by an arrow 580 and is discharged through a tube 581 as indicated by an arrow 582. The supercharged air is then directed to the engine.

The driving gear 544 drives a planet pinion 590 fixed to a pinion 591 which meshes with the driven gear 548 and with a pinion 592 which meshes with a reverse sun gear 550. The planet pinions 590, 591 and 592 are rotatably mounted on a jack shaft 593, pressed into a rotary planetary housing 594, having a flange 595. The planetary housing is rotatably mounted on a hub 544A of a gear 544 and on the sleeve 549.

The flange 595 serve as an armature of an overdrive electro-magnet 596, having a limited amount of axial movement, being mounted in the housing 567 by means of a spline 597. A reverse and brake electro-magnet 598 is also mounted on the spline 597. Either magnet may be electrically energized through wires 599 and 600. The planetary gear transmission is illustrated in the neutral position.

An overdrive is effected by energizing the electro-magnet 596, to stop the flange 595, and the housing 594 from rotating. The gear 544 then drives the pinions 590 integral with the pinion 591 which drive the gear 548 at higher speed, while the stud 593 is held stationary.

A reverse and brake mechanism becomes operable upon energizing of the electro-magnet 598 to stop the flange 551 and the gear 550 from rotating. The pinion 592 then rotates and revolves around the stud 593. The pinion 591 being larger in diameter than the pinion 592 drives the gear 598 in the reverse direction.

A direct drive is effected by the cam 564 which presses against the axially shiftable clutch disc 557 to lock the disc 601 between the discs 557 and a disc 602. The disc 602 is carried by a sleeve 603, pressed on the sleeve 552. The disc 601 is secured to the flange 551 by means of a splint 604. When the discs 557, 601 and 602 are pressed together, the flange 551 is locked to the shaft 547, and the planetary gears rotate as a whole with their housing.

The guide wheel assembly is slidably secured to a sleeve 570 by means comprising a multiple screw 610, a hub 611, and a web 612. A second stage of the low speed vanes including a first series comprising the long semi-free flexible vanes 613 pivoted at 614; the short semi-free flexible vanes 615 pivoted at 616 having stops 617, and as more clearly shown in Figure 4, the fixed discharge vanes 619; a first shroud 620; second speed guide vanes 621; a second shroud 622; direct drive space 623; third shroud 624, and finally a first stage of low speed flexible vanes of the same design as shown in Figures 18 and 19, having outboard pivots as shown at 173 in Figure 19, and outboard guides as shown at 174 in Figure 19. Attention is directed to the fact that the smallest possible number of straight ribs, with the minimum wetted area facilitates manufacture and assembly of the device.

The low speed flexible vanes 613, 614 as well as 110A are pivoted at their leading edges adjacent the outlet from the runner blades and adjust themselves in accordance with the direction of fluid flow from the runner, due to their flexibility. The fluid thus enters the guide vanes without shock or impact and is progressively guided in a smooth curvature to the discharge of the guide wheel.

The pins 617 and 618 projecting into the guide wheel channel serve as stops to limit the movement of the vanes 615 in both directions, while the longer vanes 613 are limited in their movement by the entrance edge of the vanes from the following series. At heavy loads the semi-free vanes 613 and 615 deflect, as shown in full lines in Figure 4. At light loads they occupy the dotted line position shown in Figure 4.

The vanes 110A take the shape illustrated at the left in Figure 18 during heavy loads, and assume the shape illustrated at the right in Figure 18 during light loads.

In view of the fact that the friction and shock losses of the guide vanes are quite large, it is necessary to shift the guide vanes practically out of the fluid circuit at light loads at high speeds. When the guide vanes are substantially out of the circuit the torque converter operates substantially as a turbine clutch where the torque on the runner is at all time substantially equal to the torque of the impeller, which gives the efficiency of a turbo-clutch.

The shifting of the guide vanes practically out of the fluid circuit is accomplished by the reaction of the fluid against the guide vanes. At low speeds and heavy loads, the function of guide vanes is to increase the angular momentum of the fluid. During this period of operation the torque reaction is negative, i. e. it is opposite to the direction of rotation. The guide wheel is then forced by the lead screw 610 on the sleeve 570 illustrated in Figure 1 into the fluid circuit against the compression of a spring 627 having a thrust bearing 628, until stopped by the nut 538. That is to the position A.

At light loads and high speeds, the tendency of the guide wheel is to decrease the angular momentum of the fluid, and since the torque reaction becomes positive, i. e. in the direction of rotation, the guide wheel is shifted by the screw 610 out of the fluid circuit to the position C.

When operating at medium speeds and medium loads the guide wheel reaction is smaller than at heavy loads and consequently it occupies position B, determined by the fluid reaction and by the force of the spring 627. To insure that the guide wheel will remain in the position B and not to move too easily, there are provided locking means including a ball 629, a spring 630 and a groove 631. A groove 632 in the screw 610 holds the device in position C.

Whenever additional torque is required the runner slows down and the fluid flow increases. The angle of the fluid flow increases through the guide vanes, consequently the guide wheel turns on the sleeve until it is stopped by the spring in position B or by the nut 538 in position A at heavy loads. The torque increasing function starts automatically.

At very high speeds there still would be considerable disc friction caused by the stationary guide wheel, even if it were out of the fluid circuit. The sleeve 570 is therefore not mounted rigidly to the casing 501, but rather is mounted through a one-way clutch 539 operably connected to the casing 501 by a nut 572. This one-way clutch is similar to that shown in Figure 20, and permits rotation of the sleeve in forward direction only, but stops the sleeve from rotating in the reverse direction at high speeds. It will be noted that the guide wheel, while in position A or in position B as well as in any position between and outside of these two positions and almost up to position C, possesses a torque increasing function and has a tendency to rotate in reverse direction. There is therefore a certain negative turning moment transmitted from the guide wheel to the sleeve and finally to the casing 501, whenever the guide wheel is in position A, B, which negative turning moment prevents the one-way clutch 539 from functioning. When, however, the guide wheel is shifted to the position C, the torque increasing function of the guide wheel ceases and the negative turning moment does not affect the one-way clutch 539, which is free to rotate. The one-way clutch 539 can therefore rotate one way when the guide wheel is in the position C.

The runner assembly comprises two stages. The first stage has flexible and counterbalanced vanes of the same design as illustrated in Figures 23, 24 i. e. the vanes 374 are eccentrically pivoted and secured to individual small shafts 375. Each of the shafts 375 has a lever 376, and a weight 377 at one end which serves as a centrifugal governor, held in position by a spring 378 anchored to the runner at 392.

In operation, when the runner is at rest or rotates at low speed, the spring 378 holds the blades in the backward position for low speed (Figure 23, position L). At higher speed of the runner the centrifugal force of the weight 377 overcomes the force of the spring 378, and the blades move around their shaft gradually in forward position for high speed (Figure 23, position H).

The second stage of the runner has two sets of vanes. The first set consists of semi-free and flexible vanes 528, having pivots 529 and stops 643. The second series comprises long fixed vanes 530 and short auxiliary blades 531.

In the operation of the device at low speeds, as more clearly illustrated in Figure 9, the fluid enters the ring of the semi-vanes of the runner at high velocity and impinges on the faces of the vanes 528, which are restrained from forward movement by the pins 643. The blades being from flexible material bend and form gradually curved vanes as illustrated in full lines.

At high speed of the runner, however, the velocity of the fluid relative to the runner is slower and the fluid tends to impinge on the backs of the vanes 528, which move in the direction of the fluid until they engage the entrance edge of the vanes from the second set as illustrated in dotted lines in Figure 9.

The inlet diameter of the first stage runner being smaller than the average medium diameter of the impeller outlet forms a vortex chamber. Another vortex chamber is formed between first stage blades and second stage blades of the turbine at high speed and at medium speed. The guide vanes are out of this position at medium and high speeds as illustrated at B and C.

Figure 14:
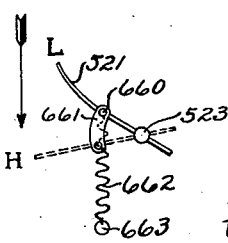
Figure 14 is a diagrammatic view illustrating the second impeller vanes of Figure 1.

The impeller comprises two sets of blades. The first set or entrance blades are counterbalanced as indicated in Figure 10 and are similar in design as those illustrated in Figure 23. The discharge blades are as illustrated in Figure 14 similar in design to those illustrated in Figures 21 and 22. Both sets of vanes are preferably formed of flexible material.

The entrance blades 520 illustrated in Figure 10 are flexible and are eccentrically pivoted to small shafts 522. Each of the shafts 522 is provided with a lever 650 (376 in Figure 23) and a weight 651 (377 in Figure 23), held in position by a spring 652 interposed between the weight 651 and the impeller shroud 653. Each blade has at its front edge a pin 654 guided in a groove 655 formed in the web 519 as illustrated in Figure 10.

In the operation of this device at heavy loads, the fluid circulation increases, and the impeller speed is relatively low. The spring 652 and the fluid pressure exerted upon the eccentrically pivoted blades (see Figure 1) hold the blades 520 in the position L for overload. In this position the blades are directed backwards at an angle of approximately 50° at the tip as illustrated in Figure 23, position L. At lighter loads the centrifugal force of the weight 651 overcomes the force of the spring 652, and the pressure of the fluid against the eccentrically pivoted blades decreases. The blades 520 then move around their individual shafts gradually to position for light load and high speeds as illustrated in Figure 23, position H, wherein the tip of the blades are positioned about 30° forward at the tip. At the same time the front edges of the blades change their inlet angles in a similar manner. The discharge blades 521 are of similar design as illustrated in Figure 14.

The outlet end of each flexible blade 521 is provided with a finger 660, to which is secured one end of a spring 662. The other end of the spring 662 is anchored to the shroud 653 as indicated at 663. The impeller shroud is provided with arched openings 661 so positioned that the blade finger 660 can freely slide in it. Movement of the finger 660 is limited by the opening which thus serves as a stop to limit the blade movement. The force of the spring 662 holds the blades in their proper position. The stronger the fluid flow at heavy loads, the more the blades deflect due to the fluid pressure exerted against them. The fluid entrance and discharge angles can thus be automatically varied under the influence of the fluid flow. The position L on Figure 14 indicates the position for low speed and position H indicates the position for high speed.

The entrance edges of the blades 521 are at an angle to their pivotal axis. The change in the entrance angle is therefore smaller than the corresponding change in the discharge angle when the blades move around their pivots. The change in entrance angle is therefore smaller than corresponding changes in the outlet angle of the blades 521.

The fluid is caused to circulate by a pump 680, having outlet ducts 681, 682 and transmission discharge ducts 683 and 684. The pump 680 can be driven from the engine or from the fluid transmission by any known means such as a belt, gears, friction drive, or can be driven electrically by a little motor from the main engine generator. The pump 680 delivers fluid into the duct 681. The fluid then passes into an annular space 573B, then through a bearing 573A into a duct 682, where it empties into the transmission at the point of impeller inlet. The fluid is returned through a hole 683 in the shaft 536, and finally through an opening 684 between shafts 536 and 547 into the gear transmission housing 567.

To obtain the best efficiency from the transmission on long non-stop trips or at high speeds, the runner may be locked to the impeller by a centrifugal clutch, an example of such a clutch being shown in Figure 2.

The impeller housing 519 has a toothed rim 670 adapted to be engaged by a pawl 671 pivotally mounted at 672 on the runner web 525. The operation of the device is thus under the control of centrifugal force of the weight 673 carried by an arm 674 integral with the pawl 671. The deflection of the centrifugal governor is counteracted by a spring 675.

A second pawl 676 associated with the pawl 671 is also positioned to be engaged by the toothed rim 670 by means of the spring 675, whenever the runner speed approaches the impeller speed, i. e. when the car speed tends to make it travel at a higher speed than that corresponding to the engine speed, as when descending long steep grades "on the gears." When the pawl 676 is engaged with the rim 670, driving torque can be transmitted from the runner to the impeller and consequently the engine can be used as a brake.

In the operation of this device, when the secondary shaft is at rest or rotates at slow speed, the spring 675 urges the pawl 671 out of engagement with the toothed rim 670 so that no torque can be transmitted from the impeller to the runner directly, but rather the torque must go through the fluid transmission. At very high speeds the centrifugal governor 673 overcomes the force of the spring 675, and urges the pawl 671 into engagement with the toothed rim 670. The runner and the impeller then rotate together thereby producing "direct drive." Whenever the speed decreases below certain predetermined limits the spring 675 operates to disengage the pawl 671, and the device becomes a torque converter.

In view of the fact that greater economy in operation is obtained when direct drive is employed, that is when the impeller and the runner are fixed together, it is desirable to employ the direct drive as much as possible. It is, however, necessary that the device be very flexible so that maximum power will be available instantly when needed for rapid acceleration. To obtain the maximum efficiency and economy it is of course desirable that the locking and unlocking of the runner to the impeller be accomplished automatically. These desirable features are accomplished by a novel control mechanism, one illustrative example of which is illustrated in Figure 3.

It will be observed that the direct drive in the medium speed range is controlled in part by a speed responsive mechanism. Two cylinders 100 and 101 are separated by a diaphragm 102 having a shaft 103 projecting therethrough. The cylinder 100 is connected to any suitable source of differential fluid pressure, such, for example, as the manifold of engine (not shown) by a pipe 104. The cylinder 101 is connected by means of a pipe 105 to a gear pump 106 operably connected to the driven shaft 547. The volume of fluid discharged by the pump 106 is dependent directly on the speed of the driven shaft or the speed of the car since the liquid or fluid pressure produced by the gear pump is directly proportional to the rotational speed of the driven shaft of the car. It is apparent that the membrane of the pump is under influence of the manifold pressure from one side as well as under influence of the oil pressure on the other side. The movement of the plunger 103 is therefore the resultant of both forces—manifold pressure and oil pressure. Manifold pressure, however, is approximately proportionate to engine torque, as pointed out in an article in the S. A. E. Transactions of 1934, pages 221 and 222. The oil pressure is approximately proportionate to car speed, hence we can say that the membrane and plunger movement or the position thereof is determined approximately according to both engine torque and car speed. The principle of the action is: A. The smaller engine output per revolution, the smaller pressure in the manifold, the sooner the conductor 721 locks the turbo-transmission and connects the overdrive. In engines without superchargers the manifold pressure is always less than atmospheric pressure, whereas in engines with superchargers the manifold pressure can be less or greater than atmospheric pressure according to the speed of the supercharger. B. The faster the car moves the higher the oil pressure is developed by the pump 106, and the sooner the conductor 721 locks the turbo-transmission and connects the overdrive.

This result is shown in Figure 6. With throttled engine, the overdrive is reached at comparatively low speeds (sphere of action D) because the manifold pressure is low, therefore the oil pressure overcomes the manifold pressure easily and the diaphragm 102 bends forward connecting the conductor 721 with the overdrive wire 599. At wide open throttle the manifold pressure increases, and it takes much higher car speeds to develop sufficient oil pressure in the pump 106, in order to overcome the manifold pressure on the forward side of the diaphragm and to connect the overdrive (see Figure 6). The same principles apply to the other speeds, see spheres of action A, B, C, D. That is the reason why the dividing lines between A and B, B and C, and C and D are inclined as shown in Figure 6.

The forward cylinder 100 is provided with a compression spring 707, one end of which engages the diaphragm 102. The other end of the spring engages a plunger 708. The force exerted by the spring 707 may be varied by shifting the position of the plunger 708 by means of a cam 710 engaging therewith and operated by a lever 711.

The position of the diaphragm may be controlled by the accelerator of the vehicle if desired. For this purpose a plunger 112 engaging the diaphragm 102 is provided. The throttle lever 113 is pivotally supported at 114, and is operably connected through a lever 116 and a relatively stiff cable 124 to the accelerator pedal (not shown) of the vehicle. The action of the accelerator pedal is not independent but rather depends upon the oil pressure (car speed) and upon the manifold pressure (engine torque) because it acts through the yieldable diaphragm 102, which is under the influence of the oil and manifold pressure. As the accelerator pressure increases the throttle valve (not shown) moves rod 112, pushes backward on the diaphragm, (in the same direction as the manifold pressure) and the engine output per revolution increases, and vice versa. As the accelerator pedal pressure decreases and the throttle valve closes, the rod 112 moves forward and the engine torque decreases. It is apparent therefore that the accelerator pedal influence is similar to the influence of the manifold pressure and consequently it is not necessary to connect the pipe 104 with the engine manifold, whenever control by the accelerator is used, and still the result will be similar to that illustrated in Figure 6. It is believed best, however, to operate the control as illustrated, and use the accelerator influence only partly, i. e., the rod 112 does not need to be in contact with the diaphragm all the time. The cable 124 must be sufficiently stiff to transfer force from the accelerator pedal but should not be too stiff, otherwise the accelerator forced too far might shift the transmission into a lower speed even at high speeds, which is not desirable according to Figure 6. That is the reason why the accelerator pedal influence must be yieldable (cable 124, and membrane 102 are both yieldable).

The plunger 103 carries an insulated conductor 721 connected with a wire 720 leading to a battery terminal. As the plunger 103 slides forward, the conductor 721 first engages a main clutch wire 512 and later an overdrive wire 599. The conductor 721 is, during this period of operation, in contact with a wire 558 contacting with a direct gear drive. This contact is designed to be interrupted before the conductor 721 engages the overdrive 599. Engagement of pawls 671 is facilitated by an electro-magnet 677, which is energized by an electric conductor 512' in contact with a wire 512. Undesirable shifting from one speed to another is prevented by controlling the plunger by means of a ball 118 yieldingly urged by a spring 117 to seat in one or the other of grooves 719 or 722.

Figure 5 illustrates a modification of the control switch of Figure 3. While the device in Figure 3 shows the control for magnetic clutches for overdrive 599 and direct drive for turbo-transmission 512, and direct drive for the gear transmission 558. The device illustrated in Figure 5 embodies the control for overdrive 599A, direct drive for turbo-transmission 512A and low speed 820. The function of the switch is similar to the function of the switch of Figure 3, and corresponding parts are designated by the same numerals as in Figure 3 but with an affix A. As the conductor 721A slides forward it engages first a low gear speed clutch wire 820, later a turbo-transmission clutch wire 512A and finally an overdrive clutch wire 599A. The conductor can at the same time be in contact with the wires 512A and 599A but not with the wire 820. If a direct gear drive is desired, then the wire 558A (not shown) must be located between the wires 820 and 512A, but at such distance from the wires 820 that 558A and 820 cannot be in contact with the conductor 721A at the same time.

The operator may select forward, neutral or reverse by means of a hand lever 715, in Figure 1, operably connected to a master switch. The switch operates through a contact 726 and wire 600 to energize an armature 598 to select reverse, and through a contact 725 and wire 720 to select forward speed. The speed ratio in the forward direction is effected automatically by the control device, which selects and changes the transmission ratios approximately in accordance with the power demanded as indicated approximately by variations in the engine manifold pressure and by the driven shaft speed as indicated in the diagram of Figure 6. It will be observed in this diagram that the area A indicates the operating sphere of the turbo torque converter; the area B indicates the operating sphere of the turbo clutch; the area C indicates the operating sphere of the direct drive, that is when the fluid transmission is locked, and the area D indicates the operating sphere of the overdrive.

The diameter of the diaphragm of the control device and the spring tension as well as the area of the relief valve are so proportioned as to give the control ratio indicated in the diagram of Figure 6. The solenoids 596 and 598 under the control of the operator function to engage or disengage the clutches or brakes of the transmission.

The control device is preferably located parallel with the vehicle axis. The direction of the forward speed of the car is indicated by the arrow 723 in Figure 3. When mounted in this manner the acceleration and the inclination of the vehicle also assists in selecting of the proper gearing. During high acceleration the membrane has a tendency to slide backward whereupon shifting into a lower gear is facilitated. This action is due to inertia of membrane and the associated parts such for example as the shaft and the conductor, and also due to sensitive construction, and the proper balance of the structure as well as the minimal friction of the mechanism. When decelerating or descending a hill the transmission has a tendency to stey in higher gear. Of course when descending very steep hills the lever 711 can be used to lock the transmission at low speed or the gear transmission can be shifted into reverse by means of the lever 715. The torque converter should transmit about 40% of the vehicle's top speed, maximum turbo-clutch should be around 60%, while direct drive should be maintained up to 80% of the top speed at the maximum engine output. Where the engine is only partially loaded the gearing changes should be made correspondingly sooner as indicated on Figure 6.

When the device is put in operation, the pump 706 will deliver fluid under pressure and the pressure developed will depend on the velocity of pump. At high pump speeds high pressure will be developed by the pump, and at low pump speeds only moderate pressure will be developed by the pump. A relief valve 825 is provided to limit the pressure developed by the pump 706 within safe limits. It thus follows that the governor operably connected to the pump 706 is a speed responsive governor since the relief valve 825 is not operated until a substantially predetermined pressure is developed by operation of the pump at a substantially predetermined speed which is above the normal range of operation of the device.

The use of the planetary gears 516, 517 and 518 is of considerable importance in connection with the turbo transmission, as shown in Figures 1 and 26. These gears enable the fluid device to transmit great amounts of power efficiently, yet the dimensions of the turbine transmission remain small because the impeller rotates at higher speed than the engine and a portion of the power is transmitted directly to the driven shaft.

The operation of the planetary gearing in the device is as follows. The spindles 515, as well as the runner, being connected together rotate at engine speed at heavy loads. The driven shaft 536 and the ring gear 517 rotate slowly, whereupon the small sun gear 518 revolves much faster than the engine. The capacity of the transmission is thereby greatly increased. At light loads and high speeds their speed does not differ much but at these speeds the capacity of the transmission is always great due to its speed.

Power from the sun gear is transmitted to the impeller, and from the impeller to the runner, and from the runner back to the driving shaft. Whenever the driven shaft is overloaded only a portion of the energy generated by the engine is absorbed by the driven shaft and the remaining portion is returned to the driving shaft while a forceful torque is created in the driven shaft. In this way power can be transmitted very flexibly, particularly at low speeds or when starting very high torque can be created in the driven shaft. The torque of the primary shaft remains practically constant but the speed of the impeller is increased due to the accumulation of energy which was no absorbed by the driven shaft.

This method also permits great variation of the gearing ratios or torques while the relative velocities of the impeller and the runner do not differ as much as by directly connected turbo transmissions. This condition greatly decreases changes of fluid inlet and outlet angles which in turn improves efficiency at all speeds.

At standstill no energy is absorbed by the driven shaft, and all the energy from the power circuit (neglecting losses) comes back to the planetary spider which is rigidly fastened to the engine shaft, the returned energy unloads the engine with the result that the engine speeds up. At the same time the torque of the runner and therefore the torque of the driven shaft is greatly increased. At overloads, the angular speed being small, only a part of the energy generated by the engine is absorbed by the driven shaft. New rotative energy is, however, being received constantly from the engine. The accumulation of the rotative energy must therefore rise, and the driving shaft as well as the impeller must increase their speed. This is the first power circuit in my transmission.

The second power circuit is formed by the use of the planetary gearing and the supercharger referred to above. The force required to drive the supercharger is taken from the sun gear 518 and is returned directly to the engine (not shown). It is believed apparent that this is a desirable type of drive for a centrifugal supercharger since it rotates faster at heavier loads than at light loads. Superchargers driven directly from the engine are almost useless at heavy loads and slow speeds.

The described principle of returning the remaining energy which was not absorbed by the driven member, back to the driving member can be applied to electrical, pneumatic and hydraulic transmissions. In each case it consists of a driving member, a driven member connected by a planetary gearing with which an electrical, pneumatic or hydraulic transmission is combined.

In Figures 7, 8, 11, 12, 13, 15, 16 and 17 the driving shafts are indicated by the numerals 730 to 737 inclusive. The driven shafts are represented by the numerals 738 to 745 inclusive. The numerals 746 to 753 inclusive represent planetary spiders carrying planet pinions 754 to 763 inclusive. Numbers 764 to 773 inclusive represent sun gears, and numbers 774 to 780 inclusive represent ring gears connected to driven shafts. Numbers 781 to 789 inclusive represent generating members (generators) connected to the sun gears. Numerals 790 to 797 inclusive represent energy absorbing members (motors) connected to the driving shafts.

The embodiment of the invention illustrated in Figure 7 relates to fluid turbine torque converter, having a guide wheel 800, axially shiftable by means of a piston 801 located in a cylinder 802, and operated by engine vacuum through a pipe 804. A hole 803 operates as a vent to atmospheric pressure from the front end of the piston, and 805 represents a one-way clutch. Numeral 806 represents a vacuum valve, under the control of a solenoid 807, which again is regulated by a control device of Figure 3, solenoid 807 being preferably connected to conductor 558 of Figure 3. Numeral 808 is a spring which tends to return the guide wheel in the fluid circuit whenever vacuum is weaker or whenever the vacuum is shut off. The numeral 809 represents a screw, on which the guide wheel is mounted and upon which it slides under the control of fluid reaction.

Basically this device is a fluid transmission, having a guide wheel axially shiftable out of the fluid circuit at light loads by the reaction of the fluid, and also under the control of engine output as well as the driven shaft speed.

Figure 8 illustrates diagrammatically a turbo transmission where power is transmitted to the first impeller 782. From here the power is transmitted to the first runner 791 associated with a sun gear 766 and with a second impeller 783, which again drives the second runner 792 mounted upon the shaft 739. At heavy load one part of the energy travels through turbo transmission from the first impeller 782 up to the second runner 792 to the shaft 739, while the other part of the power is transferred directly from a sun gear 765 through pinions 755 and a one-way clutch 812, a shaft 811 and planets 757 to a sun gear 767 and finally to the shaft 739. As the speed increases, and the overload decreases, all the energy goes through the two fluid circuits, and none is transmitted through the sun gear 765. The major part of the energy is transmitted to the sun gear 766, then to planets 756 and 757 then to the gear 767, and finally to the shaft 739, the planetary housing 747 being held stationary by a magnetic brake 813. At high speed, however, all the power is transmitted through two fluid circuits directly to turbine 792 and to the shaft 739, while the housing 747 is rotating.

For economy magnetic clutches 814 and 815 are provided. These clutches can lock out any fluid circuit under the regulation of the control device shown on Figure 3 or 5; magnetic clutch 814 preferably should be connected to the conductor 558, and the magnetic clutch 815 should be connected to the conductor 512 of Figure 3. In the device shown on Figure 11, a turbo clutch is employed instead of the torque converter, otherwise the operation is substantially the same as that shown on Figure 1.

Figure 12:
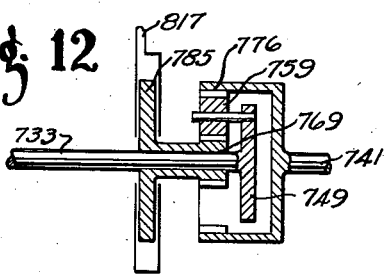
Figure 12 is a vertical section through a supercharger which may be driven by planetary gears.

The transmission illustrated in Figure 12 utilizes a high pressure turbo compressor 785 as a supercharger for returning unabsorbed energy to the engine manifold by means of a pipe 817. In this device a driving shaft 733 delivers part of the energy to the driven shaft 741 (slow rotating) while the other part of the energy, unabsorbed by the driven shaft 741, goes to the air turbo compressor 785.

Figure 13:
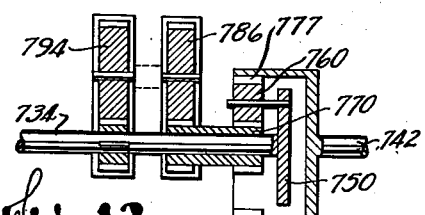
Figure 13 is a vertical section of a torque converter wherein energy may be returned to the impeller or driving means by means of gear pumps.

The apparatus shown in Figure 13 utilizes a gear pump circuit for the purpose of returning unused energy to the driving shaft. The numeral 786 represents a pressure generating gear pump which forces fluid into a driven pump 794 from which power goes back to the driving shaft 734.

Figure 15:
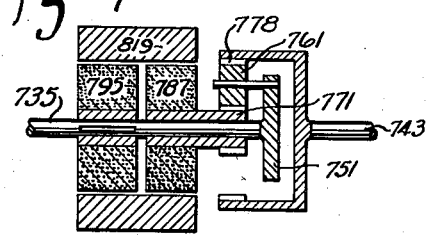
Figure 15 is a vertical sectional view through an electrically operated device.

In Figure 15 there is illustrated an electrical transmission which has similar advantages over the ordinary electric transmission without planetary gearing namely, smaller size, better efficiency and of course lighter and cheaper construction. The numeral 787 indicates an armature of an electric generator and 795 represents an armature of a motor. The numeral 819 represents magnets for the generator and the motor. This device is substantially an electric transmission having driving and driven shafts with planetary gearing interposed between them. A generator driven by the planetary gearing is employed to drive a motor mounted on the driving shaft. In this way energy unabsorbed by the driven shaft at heavy loads is return to the driving shaft by means of the electrical generator and the motor. It is believed obvious that the armature 787 can drive the armature 795 directly as an electrical clutch.

Figure 16:
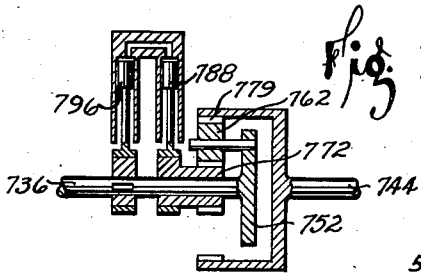
Figure 16 is a part vertical section of a torque converter wherein energy may be returned to the impeller by means of plunger pumps.

A pneumatic transmission illustrated in Figure 16 employing a compressor 788 is utilized to drive a motor 796 on the driving shaft 736, and to return the unabsorbed energy to the driving shaft.

Figure 17:
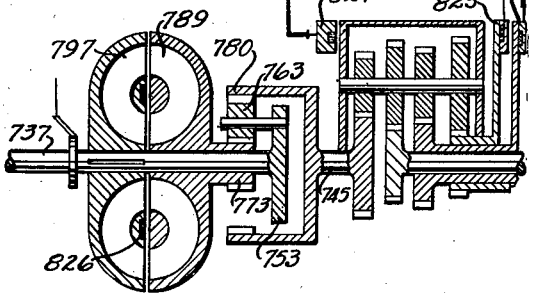
Figure 17 is a longitudinal sectional view showing somewhat diagrammatically, a turbo transmission combined with reverse, low speed, direct, and overdrive gearing.

Figure 17 illustrates a fluid device similar to the apparatus shown on Figure 1. This device includes an overdrive and reverse gear, and also an emergency low speed. The control mechanism for this device must of course have an overdrive switch wire 599A and a direct drive switch wire 512A as well as a low speed switch wire 820. The operation is otherwise similar to that described in connection with the devices shown on Figures 1, 3 and 5. At heavy loads and slow speeds the plunger 703A connects the low speed electro-magnet 825, by means of wires 820. As the speed increases, it connects a clutch electro-magnet 824 by means of a wire 512A, and finally an overdrive magnet 827 are connected by means of a wire 599A, see also Figure 5 for control switch. It is obvious that only one speed of the gear transmission can be connected at one time, consequently the distance of the wires 820, 512A and 599A in Figure 5, for this case must be such that conductor 721A touches only one wire at the same time.

The shape of the flexible rotor vanes 110A is shown in Figure 18, left for heavy loads, and right for light loads. The entrance edge at heavy loads is curved forward, but at light loads it is curved backwards due to the motion of the fluid relatively to the runner vanes. For this reason rotors with fixed and forward curved vanes are efficient at low speeds, and become inefficient when the speed of the runner approaches the speed of the impeller. The runner is provided with pivoted and automatically adjustable vanes. Figure 19 illustrates an example of a detailed construction of such a flexible vane 110A. At the entrance edge of the vane a metallic clamp 170 is pivotally supported at 173 and is riveted to a flexible plate 172 formed of rubber or other suitable material. The discharging tips 171 are formed from metal or other strong material as Bakelite, slidably supported by a bolt 174.

A turbine power transmission using a runner or an impeller of the type shown on Figure 18 or 19, possesses a feature of flexible blades supported in such a way that the angles of entrance and discharge automatically adjust themselves under the control of fluid flow.

The rotary blade wheel shown in Figures 21 and 22 comprises a web 324, a shroud 325 and movable blades 326 eccentrically pivoted at 327. Tension spring 328 holds the blades in proper position. The stronger the fluid flow, the more the blades deflect due to the fluid presure exerted against them. This is because the angles of entrance and discharge can be automatically adjusted under the control of the fluid flow. Position L is assumed at low speeds and heavy loads, and position H is assumed for high speed and light loads. It is evident that the same design using eccentrically pivoted vanes held in position by a spring and automatically adjustable by the fluid flow can be used also for the impeller, as well as for the guide wheel and for the runner construction.

Basically the torque converter with a runner, impeller or guide wheel as in Figures 21 and 22 represents a fluid device wherein the runner, impeller or guide wheel are equipped with eccentrically pivoted vanes adjustable automatically under the control of the operating fluid.

The form of my invention illustrated in Figures 25, 26 and 27 is especially adapted to transmit great amounts of energy, while the dimensions of the turbine transmission remain comparatively small. This great capacity of the device is due to the use of planetary gearing. The numeral 330 indicates a casing to which a runner assembly 241 is suitably fastened. This casing may be attached to the crankshaft of an engine, or to any driving shaft 207, the runner having long blades 331 and short blades 332 as shown in Figure 25. Within the casing there is provided an impeller assembly 229 having an internal gear 333 and a hub 334 rotatably mounted on the hub of a sun gear 335. The sun gear is rigidly secured to a secondary shaft 217. The casing 330 is provided with spindles 336 held in place upon the casing by means of a nut 337 or the equivalent. Upon each spindle is rotatably mounted a planet gear 338 in mesh with the internal and the sun gears. A stationary guide wheel 253 is located within the casing and is secured rigidly to a stationary sleeve 339 which is also carried by a gear case 340. This gear case also contains constant mesh gears 341 and 342, reverse gears 343 and 344, emergency low gears 346 and 347, jaw clutch 348 electrically operated by a switch 349, and a third shaft 350. Leakage of the fluid is prevented by a stuffing box comprising metallic discs 351 and 352, packing 353, and spring 354A, which rotate with the runner thereby preventing rapid wear of the packing.

The operation of this device is as follows. It is to be observed that the spindles 336 rotate at the speed of the driving shaft 207, the rotation of which is to be transmitted to the secondary shaft 217. If the driving shaft runs at slow speed, the driven shaft 217 will remain stationary, for the reason that at a slow rotation of the driving shaft, the impeller also revolves slowly and there is not enough turning effort required by the impeller to resist revolving of the planet gear. Under these conditions the sun gear is stationary, the planet and internal gears revolve in the direction of the driving shaft. Obviously as the impeller 229 is rotated, fluid flows through it thereby receiving energy. The received energy is transmitted to the turbine wheel 241, rigidly connected to the casing 330 through which the fluid streams to the guide wheel where additional angular momentum is imparted in the fluid, finally the fluid returns again to the impeller. As the speed of the driving shaft increases, rotation of planet and internal gears as well as impeller increases, and the turning effort necessary to maintain the impeller rotation increases with the square of impeller speed. Consequently a turning moment is also transmitted by the planet gears to the sun gear and to the secondary shaft 217 until the resistance of the driven wheels of a motor vehicle is overcome the vehicle accelerates and the sun gear starts to revolve. As soon as the sun gear rotates, the rotation of the planet gears about the spindles slows down and consequently the internal gear and the impeller slow down. When the vehicle is brought to a certain speed, acceleration of the car stops and the torque of the secondary shaft decreases. The torque of the impeller must, of course, decrease in the same ratio as the torque of the secondary shaft since both are driven by the same planet gears, until the impeller, the runner, and the secondary shaft all revolve at approximately the same speed whereupon the planet gears stop rotating about their spindles and the internal and the sun gear revolve at the same speed. If now a greater load is applied to the driven shaft, the sun gear torque increases and this gear will slow down. The planet gears will start to revolve about their spindles, and the internal gear and the impeller speed up until the force on the planet gear teeth due to the internal gear and the sun gear is balanced. It thus appears that whenever the load applied to the secondary shaft increases, the impeller speeds up beyond the speed of the driving shaft speed, with the result that the torque applied to the secondary shaft gradually and automatically increases.

It is to be noted that total energy brought to the spindles from the driving shaft is divided by the planet gears into two parts. One part goes to the sun gear and to the secondary shaft. The other part goes to the internal gear and through it to the impeller, and from the impeller to the runner, and from the runner back to the spindles. At standstill no energy is absorbed by the secondary shaft and therefore all the energy comes back to the spindles (neglecting losses of friction, eddy currents, etc.) At the same time the turning moment $t_r$ of the runner is greater than the turning moment $t_i$ of the impeller owing to action to the stationary guide wheel 253, $$t_r - t_i = i \qquad (1)$$

$i$ being the increase of the turning moment or angular momentum due to guide wheel. Calling the torque of the primary shaft $t_1$, that of the secondary shaft $t_2$, and the turning moment of the spindles $T$, we obtain the following equations:

$$T = t_r + t_2 \qquad (2)$$

because the spindles drive the impeller and the secondary shaft.

Further:

$$t_1 + t_r = T \qquad (3)$$

i. e. the torque of the driving shaft plus the torque of the runner brought back to the spindles equals the turning moment of the spindles.

Then:
$$t_1 + t_r = t_i + t_2$$

from which:
$$t_2 = t_1 + t_r - t_i = t_1 + i \quad (4)$$

Therefore, the torque of the secondary shaft equals the torque of the primary shaft plus the increase of the torque due to the guide wheel.

At high speeds when the runner revolves nearly as fast as the impeller the increase in torque is nearly zero, and the torques of the primary and secondary shafts are equal.

Figure 25 shows the development of the runner blades 331 and the half blades 332 (similar design, of course, can be used for the impeller; blades 229A and half blades 229C; the guide wheel, and the gates 253A and half blades 253C).

It is apparent that the normal trajectory $K_1 K_2$ drawn normal to the flow lines through the end of a long blade 331A does not intersect the adjacent blade 331B, see trajectory $M_1 M_2$. In such a case the blade spaces lose their usual cell-shaped form, the blades 331 would be called cell-shaped if a trajectory $K_1 K_2$ drawn normal to the flow lines through the end of a blade 331A would intersect the adjacent blade 331B forming instead a "non-cell-shaped" passageway. However, in Figure 25, the half blades 332 are added, so the discharging half of blades is of the usual cell-shaped form but the entrance half of the blades 331 is of the non-cell-shaped form. This construction reduces the losses due to the entrance angle of the fixed vanes not being correct at various speeds because the fluid is partly guided by the entrance tips of the vanes 331 before it strikes the more numerous cell-shaped half blades 332.

Shifting in "direct" or "reverse" is accomplished by sliding the jaw clutch assembly 348 axially on the spline 364 of the third shaft by means of an electro-magnet. Clutch 348 is equipped with two coils 362 and 363 and with toothed rims 356 and 357, while the gear 341 has a toothed rim 358, and the reverse gear 343 has a toothed rim 359. When the switch lever 349 closes the circuit (position F) from the battery, or other desired source, with a conductor 355, the electric coil 362 generates magnetic force and the clutch 348 is urged toward the toothed rim 358 until the rim engages with the toothed rim 356. When the lever connects the current with the coil 363 by means of conductor 354 (position R), the clutch will be locked with the reversing gear 343 by means of the teeth 357 and 359. Otherwise, this gear transmission operates as any other change speed gear. The teeth of the rims 356, 357, 358 and 359 are tapered (Figure 27) so that they disengage as soon as the electric current is shut off and magnetic force disappears.

In the construction shown in Figures 23 and 24 a two stage radial turbo torque converter is illustrated. The numeral 365 indicates the end of the engine crankshaft carrying a fan shaped flywheel 366, and driving a primary shaft 208 by means of a spline 367. A stationary casing 368 with a cover 369 are bolted to the flywheel housing 370. A first impeller 231 and a second impeller 232 are secured to each other by means of a sleeve 371, and bolts 372 and 373. Both runners 244 and 245 have adjustably movable blades 374 (Figure 23) eccentrically pivoted and secured to auxiliary shafts 375. Each auxiliary shaft 375 has a lever 376 and a weight 377 (a centrifugal governor) which is kept in position by a spring 378, anchored to a runner shroud 379 or 380 at 392.

The guide wheel of this device comprises a bladeless vortex chamber 381, a bladeless space 382 with almost uniformly diverging boundaries and with an enlarged space 383 just ahead of the entrance into the gates 255.

In reference to the stuffing box assembly 384, a packing 385 compressed between a sleeve 386 and a disc 387 by a spring 388, rotates with the shaft 208 as well as the sleeve 386 and the disc 387. Wear of the packing is therefore minimized.

In operation, when the secondary shaft 221 is at rest or rotates at low speed, the spring 378 holds the blades 374 in position for low speed (Figure 23, position L). At a higher speed of the secondary shaft, the centrifugal force of the weight 377 overcomes the tension of the spring 378 and the blades 374 move around their shafts gradually into position for high speed (Figure 23, position H).

Fundamentally this device comprises a guide wheel, impeller, and a runner having movable and adjustable blades and means for turning the blades while in operation for adjusting the angles of entrance and discharge automatically under the control of centrifugal force. In reference to Figure 23, it is obvious that a certain amount of self-adjustability of the vanes 374 can be obtained even without using the weight 377 and the spring 378. All that is necessary is to have more weight or longer blade on the discharge side and less weight or shorter blade on the inlet side of the blade. The center of gravity being out of the center of support, the blades at high speed are assuming a more or less radial position since centrifugal force overcomes the fluid pressure. At low speed the blade takes more or less tangential position since the fluid pressure overcomes the centrifugal force.

In Figure 20 the one-way clutch 539 of Figure 1 is of the multiple roller type. Inside of the cylindrical housing 403, a pair of outer wedges 424 and inner wedges 425 are employed and between them a plurality of rollers 426. The clutch is capable of independent rotation in one direction only when torque is applied thereto. The rollers 426 are compressed by wedging action of parts 424 and 425 and produce great pressure on the outer wedges against the housing 403 and the inner wedges against the tubular member 128. In this manner the tubular member 128 can be secured to the housing 403 by means of friction in one direction.

In Figure 20, it is to be noted that the outer hardened shell 403 of the one-way clutch 539 is held against rotation in the hub 423 of the housing 519 by a pin 402, positioned in a hole 405 of the shell 403 by a compression spring 401. When the solenoid coil 400 is energized through the wire 512C connected with the wire 512 of the regulator illustrated in Figure 3 (or the alternative regulator as shown in Figure 5), the electromagnet pulls the pin 402 out of the hole 405 and outer shell as well as the one-way clutch as a whole is free to rotate. It is obvious that this happens at the same moment when the impeller and the turbine get locked together by the electro-magnet 677. A clutch of this design is used in the device illustrated in Figure 1 and its function is described on page 4, column 2, lines 20 to 48.

In the above described devices planetary gearing is utilized to return energy to the primary shaft as well as to reduce the size of the transmission. It is obvious that the geared up device would be still smaller.

This is a continuation-in-part of my copending application, Serial Number 547,256, filed June 27, 1931, and renewed July 10, 1936.

While the invention has been descirbed with particular reference to a number of desirable embodiments, it is to be understood that many changes may be made, and combinations resorted to, without departing from the spirit of this invention as defined by the following claims.

I claim:

1. A fluid torque converter having a power transmitting fluid circuit comprising an impeller, a turbine, and a guide wheel, and means for displacing said guide wheel in relation to the fluid circuit so as to form a multi-stage fluid torque converter in one position of the guide wheel or to form a single stage torque converter in another position or to transform the torque converter circuit into a fluid coupling circuit producing an unchanged torque.

2. A fluid torque converter as described in claim 1 wherein means are employed to shift the guide wheel automatically under the influence of the fluid reaction.

3. A fluid power transmission comprising a path for fluid including a pump impeller, a turbine runner, a guide wheel and a member having helical grooves, means utilizing fluid reaction to shift the guide wheel on said member, means supporting said member to allow rotation thereof in one direction but restricting said member from rotation in the other direction.

4. In a power transmission device comprising a primary fluid operated power transmission and an auxiliary planetary power transmission, the primary transmission including a driving shaft and a torque converter comprising a driving member driven by the driving shaft energizing fluid, a driven member absorbing energy from fluid, and the auxiliary power transmission including primary and secondary torque multiplying means, connecting means between the driving member and said secondary torque multiplying means of the auxiliary power transmission, and means including mechanical gearing operably connected to the primary torque multiplying means and interposed between the driving and driven members whereby energy from the driving member absorbed by the driven member passes through the primary torque multiplying means to the driving shaft, and energy not absorbed by the driven member is returned to the driving member.

5. A torque converter having a driving member, a driven member, planetary gearing interposed between and operably connected to the driving and driven members comprising substantially three members, an auxiliary fluid power transmission comprising primary means driven by the planetary gearing energizing the fluid and secondary means operably connected to the driving member and absorbing energy from the fluid and torque multiplying means, all of the energy from the driving member passing to the first member of the gearing, means in said gearing to divide the transmitted energy into two paths, the main path going through the second member of the gearing to the driven member and the second path going through the third member of the gearing and the primary means and the secondary means to return unabsorbed energy to the driving member.

6. In combination, an engine including an accelerator pedal, a fluid power transmission comprising, a casing, a fluid in the casing, driving and driven blade wheels in the casing, a driven shaft supporting the driven blade wheel, the wheels having curved passages, the passages comprising a circuit in which the fluid circulates and transmits power, connecting means between the blade wheels, a controlling device regulating locking and unlocking of the connecting means automatically and comprising accelerator pedal position responsive means and speed responsive means opposing each other, the pedal responsive means being operatively connected with the accelerator pedal, the speed responsive means being operatively connected with the driven shaft.

7. In combination, an engine with an intake manifold and a fluid power transmission comprising a casing, a fluid, driving and driven blade wheels in the casing, said wheels having curved passages comprising a circuit in which the fluid circulates and transmits power, electro-magnetic connecting means between the driving and driven blade wheel, a driven shaft supporting the driven blade wheel, a controlling device regulating locking and unlocking of the connecting means automatically under the control of the vacuum in the manifold as well as under the control of the speed of the driven shaft, the influence of the manifold counteracting constantly the influence of the speed.

8. In a fluid power transmission a casing, a fluid, juxtaposed blade wheels in the casing, the wheels having curved passages forming a circuit in which the fluid circulates and transmits power, at least one of said blade wheels having pivotally movable blades, each blade having a weight to counterbalance the fluid pressure against the blade and adjust its inclination by the centrifugal force of the weight.

9. In a fluid power transmission a casing, a fluid, juxtaposed blade wheels in the casing, the wheels having curved passages forming a circuit in which the fluid circulates and transmits power, at least one of the blade wheels having pivotally mounted blades, a spring associated with each blade to balance the fluid pressure against the blade and to adjust its inclination while in operation, some of the pivoted blades having balancing weights.

10. In a fluid power transmission a casing, a fluid, juxtaposed blade wheels in the casing, said wheels having curved passages forming a circuit in which the fluid circulates and transmits power, at least one of the blade wheels having pivotally mounted blades, each blade having a weight and a spring to balance the fluid pressure against the blade and adjust its inclination.

11. In a fluid power transmission, a casing, fluid, and juxtaposed blade wheels in the casing, said wheels having curved passages forming a circuit in which the fluid circulates and transmits power, at least one of the wheels having eccentrically pivoted blades, each blade having a weight to balance the fluid pressure against the blade so the blades are forwardly inclined at high speeds but backwardly inclined at low speeds.

12. In a fluid device, a casing, a fluid in the casing, blade wheels in the casing, said wheels having curved passages forming a circuit in which the fluid circulates and transmits power, at least one of said wheels having flexible and pivoted blades automatically adjustable under the control of the fluid flow, and automatic means including counterbalancing weights carried by the last named wheel to adjust each of the pivoted blades under the influence of centrifugal force.

13. In a fluid power transmission a casing, fluid, and juxtaposed blade wheels in the casing, said wheels having curved passages forming a circuit in which the fluid circulates and transmits power, at least one of the wheels having two sets of blades, the units of one of the sets having pivoted and flexible blades, and automatic means carried by the last named wheel to adjust the pivoted blades under the influence of centrifugal force.

14. In a fluid power transmission, a casing, fluid and juxtaposed blade wheels in the casing, said wheels having curved passages forming a circuit in which the fluid circulates and transmits power, at least one of said blade wheels having a plurality of sets of blades, the units of one of the sets of blades having a weight to counterbalance the fluid pressure against the blade and to adjust its inclination by centrifugal force of the weight.

15. In a power transmission device having a driving shaft and comprising a primary fluid pressure operated power transmission and an auxiliary planetary power transmission, the primary transmission comprising an impeller member operably connected to the driving shaft to energize fluid, a turbine member associated with the impeller member to absorb energy from the fluid, the auxiliary power transmission comprising primary and secondary torque multiplying means including a planet gear carrier member and a sun gear respectively, connecting means between the impeller and sun gear, and planet carrier means interposed between the turbine member and driving shaft whereby energy from the impeller absorbed by the turbine passes through the planet carrier to the driving shaft.

16. A variable speed power transmission having a plurality of members to transmit power to each other in parallel and a plurality of members to transmit power to each other at varying speeds in series, presure inducing means driven by one of said members to develop pressure proportionately to the speed of said member, a regulator under the influence of the pressure developed by said pressure inducing means, means under the influence of variations in power transmitted to influence the position of the regulator, and means operated by the regulator to automatically render certain of said members operative and to render certain of said other members inoperative to transmit power at varying speed ratios in response to variations of pressure developed by the pressure inducing means and variations of power transmitted.

17. A fluid power transmission comprising a passage for circulating fluid including power transmitting blade wheels forming the working circuit, at least one of said wheels having movable pivoted blades changing the angle of fluid entrance and discharge, the change in the entrance angle being different than the corresponding change in the discharge angle, and counterweights attached to the pivoted blades.

18. A fluid power transmission having a power transmitting fluid circuit comprising rotary blade wheels and a guide wheel forming the working circuit, automatic means for displacing said guide wheel in relation to the fluid circuit to form a multi-stage torque converter in one position of the guide wheel or to transform the torque converter circuit into a fluid coupling circuit, one of the rotary wheels having two stages, the guide wheel being positioned between said stages, the automatic means being controlled by the reaction of the power transmitting fluid.

19. In a fluid power transmission, a casing, fluid and rotary blade wheels in the casing, the wheels having curved passages forming a circuit in which the fluid circulates and transmits power, at least one of the blade wheels having pivotally mounted blades wherein each blade is designed to balance the fluid pressure against it and adjust its inclination in accordance with its own centrifugal force, and counterweights connected to said blades, each blade to be adjusted individually.

20. In combination, a driving member, a driven member, a variable speed transmission device having a primary member and a secondary member, said secondary member being in operative relation with the driving member, and a booster driven by the driving member and in operative relation with the driven member and with the transmission device, the booster operating the transmission at variable speeds, all of the energy to be transmitted going from the driving member to the booster, from the booster part of the energy goes to the driven member and the other part through the transmission to the driving member.

21. In combination, a driving member, a driven member, a variable speed transmission device having a primary member and a secondary member, said secondary member being in operative relation with the driving member, a booster driven by the driving member and comprising an epicyclic gearing having one member in operative relation with the driven member, and an auxiliary member in operative relation with the transmission device, the booster operating the transmission at variable speeds, all of the energy to be transmitted going from the driving member to the booster, from the booster part of the energy goes to the driven member and the other part through the transmission to the driving member.

22. In combination, a driving member, a driven member, a variable speed transmission device having rotary driving, rotary driven, and guiding blade wheels, the wheels having curved passages forming a circuit in which the fluid circulates and transmits power, said driven rotary blade wheels being in operative relation with the driving member, and a booster gearing operatively connected to the driving member and having one member in operative relation with one of the blade wheels and another member in operative relation with the driven member, the booster operating the transmission at variable speed, all of the energy to be transmitted going from the driving member to the booster, from the booster part of the energy goes to the driven member and the other part through the transmission to the driving member.

23. In combination, a driving member, a driven member, a variable speed transmission device having primary means and secondary means, said secondary means being in operative relation with the driving member, an epicyclic gearing having one member in operative relation with the primary means of the transmission device, and an intermediate member in operative relation with the other two members, the gearing serving as an additional variable speed transmission, so as to speed up the primary means at overloads.

24. In combination, a driving member, a driven member, a variable speed transmission device having primary means and secondary means, said secondary means being in operative relation with the driving member, and a booster receiving energy from the driving member and comprising a sun gear, a planet gear and an intermediate gear, one of said gears being in operative relation with the driven member and one of said gears being in operative relation with the primary means of the transmission device, the booster serving as an additional variable speed transmission, so as to speed up the primary means at overloads.

25. In combination, a driving member, a driven member, a variable speed fluid transmission device having blade wheels for transmitting power, the wheels having curved passages comprising a circuit in which the fluid circulates and transmits power, one of said blade wheels being in operative relation with the driving member, and a booster having one member carried by one of said blade wheels, and another member carried with the driven member, the booster serving as a variable transmission, a clutch between said blade wheels, a controlling device regulating the operation of the clutch automatically under the control of the speed of one of said blade wheels as well as under the control of the power to be transmitted.

26. In combination, a driving member, a driven member, a variable speed transmission device having driving and driven blade wheels, one of the blade wheels being in operative relation with the driving member, and a booster having one member associated with the driven blade wheel and another member associated with one of said members and a third member of the booster in operative relation with the driven member, said booster serving as an additional transmission, connecting means to lock the driving and the driven wheels, a controlling device regulating the locking and unlocking of the connecting means automatically under the control of the speed of one of the wheels as well as under the control of the torque to be transmitted.

27. A rotatable member for a fluid transmission having a plurality of vanes pivoted thereto and weights connected to the vanes to operate them, lines drawn from the pivots through the centers of gravity of the vanes and weights forming acute angles whereby the weights tend to turn the vanes past a radial position.

JOSEPH JANDASEK.